Patented Apr. 29, 1941

2,240,254

UNITED STATES PATENT OFFICE 2,240,254

BUILDING MATERIAL

Henry Seymour Colton, Shaker Heights, Ohio

No Drawing. Application May 26, 1939,
Serial No. 275,913

11 Claims. (Cl. 106—29)

This invention relates to improvements in building material, and has reference particularly to the production of panels, slabs and blocks that possess a high degree of microscopic porosity from which the material derives high insulating qualities. The material of the present invention also possesses considerable strength which permits it to be used in thin panels for wall board and the like.

One of the objects of the invention is the provision of a composition of matter capable of being formed into pressed articles such as wall board which shall have good strength characteristics as well as excellent insulation properties.

The present invention may be said to be an improvement over that disclosed in my Patent 2,165,344, dated July 11, 1939, entitled "Composition of matter and process of forming same from industrial waste liquor." As therein explained, large quantities of waste pickle liquor result from operations in the steel mills. This liquor has a large content of ferrous sulphate and a small percentage of sulphuric acid. It is of course injurious to animal and plant life, and the dumping of it into streams is a highly objectionable practice. My invention utilizes this waste product for the production of needed building material at relatively low cost. Copperas, being of nearly the same chemical composition as pickle liquor, can be used with equal success.

Wall board must possess a considerable amount of inherent strength owing to the fact that it is made in thin sheets of large dimensions which must be capable of withstanding the strains necessarily encountered in handling. The material of the present invention has that property.

The invention consists in diluting the pickle liquor or copperas and mixing with it an alkaline calcium compound, such for example as milk of lime, in proportions such that the mixture will turn phenolphthalein indicator pink, and adding a small proportion of at least one solid in colloidal water suspension, the colloid being intimately mixed with the other ingredients. A quantity of vegetable fiber up to 25% of the whole may be added if desired to lighten the boards. After the reactions have taken place, clear and uncontaminated water is expelled by filtering or pressing. Then the precipitate thus commingled with the colloid, as well as with the fiber if present, is molded and compacted, in some cases being subjected to very heavy pressure. By means of suitable presses the filtering and molding may be carried out as one operation if desired.

The average content of sulphuric acid in the pickle liquor is around 5%, and with pickle liquor of that acid content the calcium sulphate and ferrous hydroxide formed by the reaction are in the approximate proportions by weight relatively of three parts sulphate and two parts hydroxide. When the precipitate is formed it is green, but upon oxidation of the ferrous hydroxide to form ferric hydroxide the color changes to amber or brown. It is quite probable that the iron hydroxide when mixed intimately by co-precipitation and pressure with the calcium sulphate reacts to form ferroxy calcium sulphate ($Fe_2O_3.2CaSO_4.7H_2O$). Prior to the invention described in my earlier application above referred to this compound, due to its relatively low strength of combination, was not known. The conditions of fine particle size, intimate mixture, and pressure to coalesce or further the union, are necessary.

I have now discovered that a very considerable increase in strength or modulus of rupture for molded or pressed objects formed of this material, which is known commercially as "Ferron" may be secured by mixing with it, preferably while in the wet state, a water suspended colloid which is a solid when dried. As examples of such materials which are suitable for the purpose I may mention asphalt emulsion, starch, glue, and bentonite. These materials appear to exert similar effects in the composition but to different degrees. For example, a pressed board of calcium sulphate iron hydroxide precipate containing 15% wood fiber as a lightening ingredient has a modulus of rupture of about 150. If 2% of starch which is capable of swelling in water is added to this same formula a board is obtained having a modulus of rupture of 450. If I substitute 8% of asphalt emulsion for the 2% of starch the modulus of rupture is increased to 750. By the addition of both the 2% starch and the 8% asphalt emulsion I obtain a board with a modulus of rupture of over 1000. The effect of the water-suspended colloids in this composition thus appears to be cumulative, that is to say when two of them are included in the mix the strength of the product is increased over that which is obtained by adding either one of them alone in the most favorable proportions. In general I prefer to use a colloid of the asphalt emulsion type as this is an irreversible hydrophilic colloid and once having lost its water will not take it up again.

Any of the water suspended colloids which may be employed should be used in relatively small proportions, that is to say not generally over 10% or 15% of the whole. In the case of asphalt emulsion, which is the colloid that I at present prefer to employ, the modulus of repture of the finished and dried product increases rapidly with the increase of asphalt emulsion content up to about 5%. The curve flattens out between 5% and 15% and then falls off with an asphalt content above the latter amount. I prefer to use an emulsion which is obtained by the use of clay.

Just what chemical or physical action takes place and is responsible for the highly improved strength characteristics of the "Ferron" when combined with the water suspended colloid or colloids I am unable definitely at present to state, but I do know that the resultant increase in strength is quite remarkable. It is further contrary to what might normally be expected as an emulsion of asphalt or rosin greatly weakens most building materials such as plaster or cement.

I know of no material which is a solid at normal temperatures and which is either colloidal in itself or capable of being made colloidal by emulsification which will not operate in my invention. For example two such dissimilar substances as milk and waste sulphite cellulose liquor both strengthen my ferroxy calcium sulphate material. My theory is that the ferroxy calcium sulphate being colloidal in certain respects is strengthened by the addition of one or more true colloids which are capable of being perfectly mixed by means of an aqueous medium. The various colloids have different size gel structures which interlace, and by properly grading these various sizes a strong mass can be obtained in just the same way as a strong concrete results from selecting various sizes of gravel and stone for the aggregate.

Having thus described my invention, I claim:

1. A composition of matter adapted to be pressed and dried for the production of building material, comprising a joint precipitate of calcium sulphate and ferrous hydroxide together with a small proportion of a solid in colloidal water suspension intimately commingled with said precipitate.

2. A composition of matter adapted to be pressed and dried for the production of building material, comprising a joint precipitate of calcium sulphate and ferrous hydroxide together with a small proportion of a solid in colloidal water suspension intimately commingled with said precipitate, the colloid ingredient comprising not more than 15% by weight of the entire composition.

3. A composition of matter adapted to be pressed and dried for the production of building material, comprising a joint precipitate of calcium sulphate and ferrous hydroxide together with a small proportion of asphalt emulsion.

4. A composition of matter adapted to be pressed and dried for the production of building material, comprising a joint precipitate of calcium sulphate and ferrous hydroxide together with a small proportion of asphalt emulsion, the asphalt ingredient comprising from 5% to 15% by weight of the entire composition.

5. A composition of matter adapted to be pressed and dried for the production of building material, comprising a joint precipitate of calcium sulphate and ferrous hydroxide together with a small proportion of asphalt emulsion and another water suspended colloid.

6. A composition of matter adapted to be pressed and dried for the production of building material, comprising a joint precipitate of calcium sulphate and ferrous hydroxide together with asphalt emulsion in such proportions that the asphalt content constitutes not more than 15% by weight of the entire composition, and a small proportion of a further water suspended colloid.

7. A composition of matter adapted to be pressed and dried for the production of building material, comprising a joint precipitate of calcium sulphate and ferrous hydroxide together with asphalt emulsion in such proportions that the asphalt content constitutes not more than 15% by weight of the entire composition, and a small proportion of starch.

8. A composition of matter adapted to be pressed and dried for the production of building material, comprising a joint precipitate of calcium sulphate and ferrous hydroxide in the relative proportions by weight approximately of three parts calcium sulphate and two parts iron hydroxide, with which is mixed a small amount of fibrous material, together with an asphalt emulsion comprising approximately 10% by weight of the entire composition.

9. A composition of matter adapted for building material comprising a joint precipitate of calcium sulphate and ferrous hydroxide, mixed with a small percentage of asphalt emulsion, all pressed and dried.

10. The method of producing building material from copperas or waste sulphuric acid iron pickle liquor primarily, which consists in mixing with the diluted ferrous sulphate present in such solution a quantity of an alkaline calcium compound sufficient in amount to cause the mixture to turn phenolphthalein indicator pink, mixing therewith a relatively small quantity of a solid in colloidal water suspension, pressing the same to remove water and to compact the material, and drying the same.

11. The method of producing building material from copperas or waste sulphuric acid iron pickle liquor primarily, which consists in mixing with the diluted ferrous sulphate present in such solution a quantity of an alkaline calcium compound sufficient in amount to cause the mixture to turn phenolphthalein indicator pink, mixing therewith asphalt emulsion in the proportion by weight of 5% to 15% of the entire mix, pressing the same to remove the greater part of the water and to compact the material, and drying the same.

HENRY SEYMOUR COLTON.